(12) United States Patent
Janecke (10) Patent No.: US 10,323,762 B2
(45) Date of Patent: Jun. 18, 2019

(54) THREE-WAY PRESSURE CONTROL AND FLOW REGULATOR VALVE

(71) Applicant: Parker-Hannifin Corporation, Cleveland, OH (US)

(72) Inventor: James P. Janecke, Waukesha, WI (US)

(73) Assignee: PARKER-HANNIFIN CORPORATION, Cleveland, OH (US)

(*) Notice: Subject to any disclaimer, the term of this patent is extended or adjusted under 35 U.S.C. 154(b) by 7 days.

(21) Appl. No.: 15/474,310

(22) Filed: Mar. 30, 2017

(65) Prior Publication Data

US 2017/0307096 A1    Oct. 26, 2017

Related U.S. Application Data

(60) Provisional application No. 62/325,737, filed on Apr. 21, 2016.

(51) Int. Cl.
| | |
|---|---|
| *F16K 17/22* | (2006.01) |
| *F16K 31/12* | (2006.01) |
| *F16K 11/10* | (2006.01) |

(52) U.S. Cl.
CPC ............ *F16K 17/22* (2013.01); *F16K 11/10* (2013.01); *F16K 31/12* (2013.01)

(58) Field of Classification Search
CPC ............ F16K 17/22; F16K 31/12; F16K 11/10
USPC ...... 137/625, 625.2, 625.25, 625.67, 625.35, 137/625.436, 25.69, 485–492.5, 102, 137/119.02, 505, 505.11, 505.14, 505.18
See application file for complete search history.

(56) References Cited

U.S. PATENT DOCUMENTS 2,504,720 A * 4/1950 Nixon .................... G05D 16/10
                                                         137/102
2,573,563 A * 10/1951 Gardiner ............. F15B 13/0417
                                                         137/486

(Continued)

FOREIGN PATENT DOCUMENTS

CN            101929481 A       12/2010

OTHER PUBLICATIONS

Parker-Hannifin; Pulsar VPL Series Valve from Parker Hannifin; Bulletin HY14-2100/US, 2002.

(Continued)

*Primary Examiner* — William M McCalister
*Assistant Examiner* — Patrick C Williams
(74) *Attorney, Agent, or Firm* — Renner, Otto, Boisselle & Sklar, LLP (57) ABSTRACT

A three-way valve assembly, including a valve body having a fluid flow path and a valve member movable in the fluid flow path between a supply port and a work port, and between a load sense passage and a pressure relief port. The valve member may move between a first position and a second position for controlling flow and regulating fluid pressure differences sensed in the flow path; and for limiting fluid pressure in the flow path to a predetermined pressure level set by a pilot-operated pressure limiter valve when the valve member is in the second position. The valve member may move between the second position and a third position to open the flow path from the load sense passage to the pressure relief port for relieving fluid pressure in the flow path when the fluid pressure from an over-loaded actuator exceeds the predetermined pressure level set by the pressure limiter valve.

20 Claims, 8 Drawing Sheets

(56) References Cited

U.S. PATENT DOCUMENTS

| | | | | |
|---|---|---|---|---|
| 3,602,104 | A * | 8/1971 | Stremple | F15B 13/02 |
| | | | | 137/115.06 |
| 3,777,773 | A * | 12/1973 | Tolbert | F15B 13/0417 |
| | | | | 137/115.15 |
| 3,815,477 | A * | 6/1974 | Ailshie | F15B 11/163 |
| | | | | 91/530 |
| 3,827,453 | A * | 8/1974 | Malott | F15B 13/0417 |
| | | | | 137/115.21 |
| 4,058,139 | A | 11/1977 | Budzich | |
| 4,361,169 | A * | 11/1982 | Williams | F15B 13/0417 |
| | | | | 137/596.13 |
| 5,735,311 | A * | 4/1998 | Ishizaki | F15B 13/0417 |
| | | | | 137/596 |
| 6,328,275 | B1 | 12/2001 | Yang et al. | |
| 7,063,100 | B2 | 6/2006 | Liberfarb | |
| 8,910,657 | B2 * | 12/2014 | Stoever | G05D 16/2093 |
| | | | | 137/492 |
| 8,973,609 | B2 * | 3/2015 | Hilzendegen | F15B 11/05 |
| | | | | 137/596.14 |
| 2002/0162592 | A1 | 11/2002 | Bowden | |

OTHER PUBLICATIONS

Parker-Hannifin; Series VPL Proportional Valves, Bulletin HY14-2101-B2/US, Feb. 1, 2004.

Parker-Hannifin; MMW NS30 Mooring Winch Control Manifold; Catalog FI-EN108-B, Nov. 2007.

* cited by examiner

THREE-WAY PRESSURE CONTROL AND FLOW REGULATOR VALVE

RELATED APPLICATIONS

This application claims the benefit of U.S. Provisional Application No. 62/325,737 filed Apr. 21, 2016, which is hereby incorporated herein by reference in its entirety.

FIELD OF INVENTION

The present invention relates generally to a valve that controls flow and pressure of fluid in a flow path of a valve body, and more particularly to an integrated three-way pressure control and flow regulator valve assembly for a load compensated directional valve.

BACKGROUND

Fluid control valves are used in a wide variety of applications for causing and controlling motion of various components. Hydraulic fluid control valves and systems are used in such applications when relatively large forces are to be transmitted and controlled through such hydraulic components.

One type of hydraulic fluid control valve is a sectional valve. A sectional valve may typically include a plurality of separate cast and machined metal working valve sections. Each working valve section may include internal fluid passages, external ports, and valve bores with valve members slidably disposed within each valve bore. The valve bores may include a main control valve spool bore in which a main directional control valve spool is slidably disposed, and a pressure compensator valve spool bore in which a pressure compensator valve spool is slidably disposed. In a pressure compensated working valve section the pressure compensator valve spool is arranged to maintain a predetermined pressure drop across a variable orifice of the main control valve spool under normal operating flow conditions independently of the inlet or outlet pressure. By maintaining a substantially constant pressure drop across the orifice, a substantially constant and repeatable flow rate through the orifice may be achieved. Commonly, the pressure drop may be controlled in part by the pressure compensator spool and by the force of a biasing spring acting directly or indirectly against the pressure compensator spool.

Pressure compensated working sections may also commonly include load sense passages. The load sense passages may be operably connected to provide (i.e., transmit) a pressure feedback signal from an outlet passage or work port, which indicates the fluid pressure required by a fluid operated device, such as an actuator, which receives flow from the sectional valve. The load sense passage may be operably connected to a variable displacement hydraulic pump or other source of pressure and flow to provide a feedback signal that communicates with the pressure compensator valve to control pressure and regulate fluid flow from the source.

During operational conditions, deadheading may occur in which a working section is provided with fluid pressure from the pressure source, but substantially no flow through the main flow control valve variable orifice occurs. Deadheading may occur, for example, when flow is directed toward an associated fluid receiving actuator and movement of the actuator in response to the flow is somehow restricted or stopped, for example, at the end of a cylinder's physical stroke, or by a load that is sufficient to resist further movement of the actuator. As the flow directed from the outlet passage or work port of the working section to the deadheaded actuator decreases substantially to about zero, the pressure in the working valve section may increase. As such, the working valve section may limit the fluid pressure at the work port by providing an associated pilot-operated pressure limiter valve in the flow path of the sectional valve.

A common pilot-operated pressure limiter valve maintains a spring biased check valve element against a valve seat in the flow path that is in fluid pressure communication with the work port. When the work port pressure becomes greater than a predetermined pressure that the spring holding the check valve element closed can support, the pilot-operated pressure limiter valve is activated to open a flow path enabling venting of fluid to a reservoir or tank whereupon the pressure compensator spool shifts towards the closed position, closing off flow to the main spool and creating just enough leakage past the compensator spool to maintain a pressure at which the pilot-operated pressure limiter valve was set. Therefore, the compensator spool becomes a pilot-operated pressure reducer to maintain working pressure at a desired level.

However, while such typical sectional control valves may accommodate the deadhead operating condition by providing such a pilot-operated pressure limiter valve, such systems may not be capable of accommodating for further increases in pressure in the valve section above the predetermined pressure limitation level set by the pilot-operated limiter valve. For example, when the fluid operated device is obstructed to the point where the device is deadheaded and then is driven in the reverse direction, causing fluid to flow back through the work port, the fluid pressure in the valve section may increase beyond the predetermined level set by the pressure limiter valve, which may cause damage or catastrophic failure of the sectional valve and associated components.

SUMMARY OF INVENTION

The present invention provides a valve that enables: (1) pressure compensation for controlling flow and regulating differences in fluid pressure sensed in a flow path of a valve body, (2) pressure reduction for effectively limiting or reducing fluid pressure in the flow path to a predetermined pressure level set by a pilot-operated pressure limiter valve, and (3) pressure relief for relieving fluid pressure in the flow path when the fluid pressure in the flow path exceeds the predetermined pressure level set by the pilot-operated pressure limiter valve, for example, when a deadhead condition occurs and then flow is inadvertently reversed in the flow path.

For example, such an exemplary valve may be provided which enables such pressure compensation by adjusting the position of a valve spool in a spool bore to regulate the flow of pressurized fluid between a supply port and a work port.

Such an exemplary valve may be provided which enables such pressure reduction by activating a pilot-operated pressure limiter valve that causes the valve spool to shift to a position in which fluid pressure to the work port is reduced, and in which sufficient leakage flow may be provided into the flow path downstream from the supply port to satisfy the fluid pressure at which the pilot-operated pressure limiter valve is set.

Such an exemplary valve may be provided which enables such pressure relief by adjusting the position of the valve spool in the spool bore to open a flow path to a pressure relief port when fluid pressure in the flow path exceeds a predetermined pressure level set by the pilot-operated pressure limiter valve.

Such an exemplary valve may effectively regulate fluid flow in the flow path of the valve body while controlling and/or reducing fluid pressure therein, and while also providing an additional pressure relief function, all with the same valve member used for pressure compensation and pressure reduction that is directly in the feedback loop.

Such an exemplary valve may also reduce the number of associated components required to achieve these desired functions, and may therefore reduce the complexity and/or overall cost of the valve assembly. In addition, such a valve configuration may also enable ease of retrofitting the valve into an already-existing working valve section by utilizing existing flow paths and existing valve bores, with minimal machining required to form the associated features for achieving the desired functions.

According to an aspect of the invention, a three-way valve assembly includes a valve body having a fluid flow path; a valve member movable in the valve body and being disposed in the fluid flow path between a supply port and a work port, and between a load sense passage and a pressure relief port, the valve member having a valve surface exposed to fluid pressure upstream of the load sense passage and an opposite valve surface exposed to fluid pressure downstream of the load sense passage; wherein, in response to fluid pressure acting on the opposite valve surfaces of the valve member, the valve member is configured to move to a pressure relieving position in which the flow path from the load sense passage to the pressure relief port is opened for relieving fluid pressure in the valve body.

According to another aspect of the invention, a three-way valve assembly includes a valve body having a fluid flow path; a valve spool slidably movable within a spool bore in the valve body, the valve spool being disposed in the fluid flow path between a supply port and a work port, and between a load sense passage and a pressure relief port, the valve spool having a valve surface exposed to fluid pressure upstream of the load sense passage and an opposite valve surface exposed to fluid pressure downstream of the load sense passage; and a pilot-operated pressure limiter valve exposed to fluid pressure downstream from the load sense passage, the pilot-operated pressure limiter valve being configured to open when the downstream fluid pressure acting on the pilot-operated pressure limiter valve member exceeds a predetermined pressure level. The valve spool is configured to move in the flow path between a first position and a second position to control pressure and regulate fluid flow from the supply port to the work port in response to the differences in upstream and downstream fluid pressure exerted on the opposite valve surfaces of the valve spool. When the pilot-operated pressure limiter valve is opened, the upstream fluid pressure acting on the valve spool moves the valve spool to the second position in which flow from the supply port to the work port is regulated by the valve spool to satisfy only the pilot flow through the pilot-operated pressure limiter valve so as to reduce fluid pressure to the predetermined pressure level. The valve spool is configured to move in the flow path between the second position and a third position, and when the upstream fluid pressure acting on the valve spool exceeds a pressure level that is greater than the predetermined pressure level of the pilot-operated pressure limiter valve, the valve spool moves to the third position in which the flow from the load sense passage to the pressure relief port is regulated for relieving fluid pressure in the valve body.

According to another aspect of the invention, a method for regulating fluid flow and controlling fluid pressure in a flow path of a valve body, includes the steps: (i) supplying pressurized fluid from a supply port to a work port via the fluid flow path; (ii) regulating fluid flow from the supply port to the work port by moving a valve member having a first valve surface in the flow path between the supply port and the work port, the first valve surface moving with the valve member between a first position and a second position in response to differences in fluid pressure sensed in the flow path; (iii) activating a pilot-operated pressure limiter valve when fluid pressure acting on the pilot-operated pressure limiter valve exceeds a predetermined pressure level; (iv) after the pilot-operated pressure limiter valve is activated, reducing fluid pressure in the flow path by moving the valve member carrying the first valve surface to the second position, whereby flow from the supply port across the first valve surface is regulated to satisfy only the pilot flow across the pilot-operated pressure limiter valve; and (v) relieving fluid pressure in the flow path by moving the valve member which has a second valve surface in the flow path between a load sense passage and a pressure relief port, the second valve surface moving with the valve member between the second position and a third position to regulate the flow to a pressure relief port when fluid pressure acting on one end of the valve member exceeds a pressure level that is greater than the predetermined pressure level of the pilot-operated pressure limiter valve acting on the other end.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application to sectional control valves used in hydraulically controlled machinery, for example, machinery used in stationary, mobile, aerospace, marine, and/or other applications, and thus will be described below chiefly in this context. It is also understood that principles of this invention may be applicable to other control valves for various applications in which it is desirable to provide a three-way valve that enables pressure compensation for controlling flow and regulating differences in fluid pressure sensed in a flow path of a valve body, that enables pressure reduction for effectively reducing fluid pressure in the flow path to a predetermined pressure level, and that enables pressure relief for relieving fluid pressure in the flow path when the fluid pressure in the flow path reaches or exceeds the predetermined pressure level.

In the discussion above and to follow, the terms "upper", "lower", "top," "bottom," "end," "inner," "outer," "left," "right," "above," "below," etc. refer to a three-way valve as shown in the cross-sectional view illustrated in FIG. 1. This is done realizing that these valves, such as when used on vehicles, can be mounted on the top, bottom, or sides of other components, or can be inclined with respect to the vehicle chassis, or can be provided in various other positions. Furthermore, the terms "upstream" and "downstream" refer to the arrangement of elements along a flow path as fluid flows from a supply port, or source, to a work port or fluid operated device, realizing that hydraulic fluid may flow in either direction depending on the conditions experienced during operation.

Figure 1:
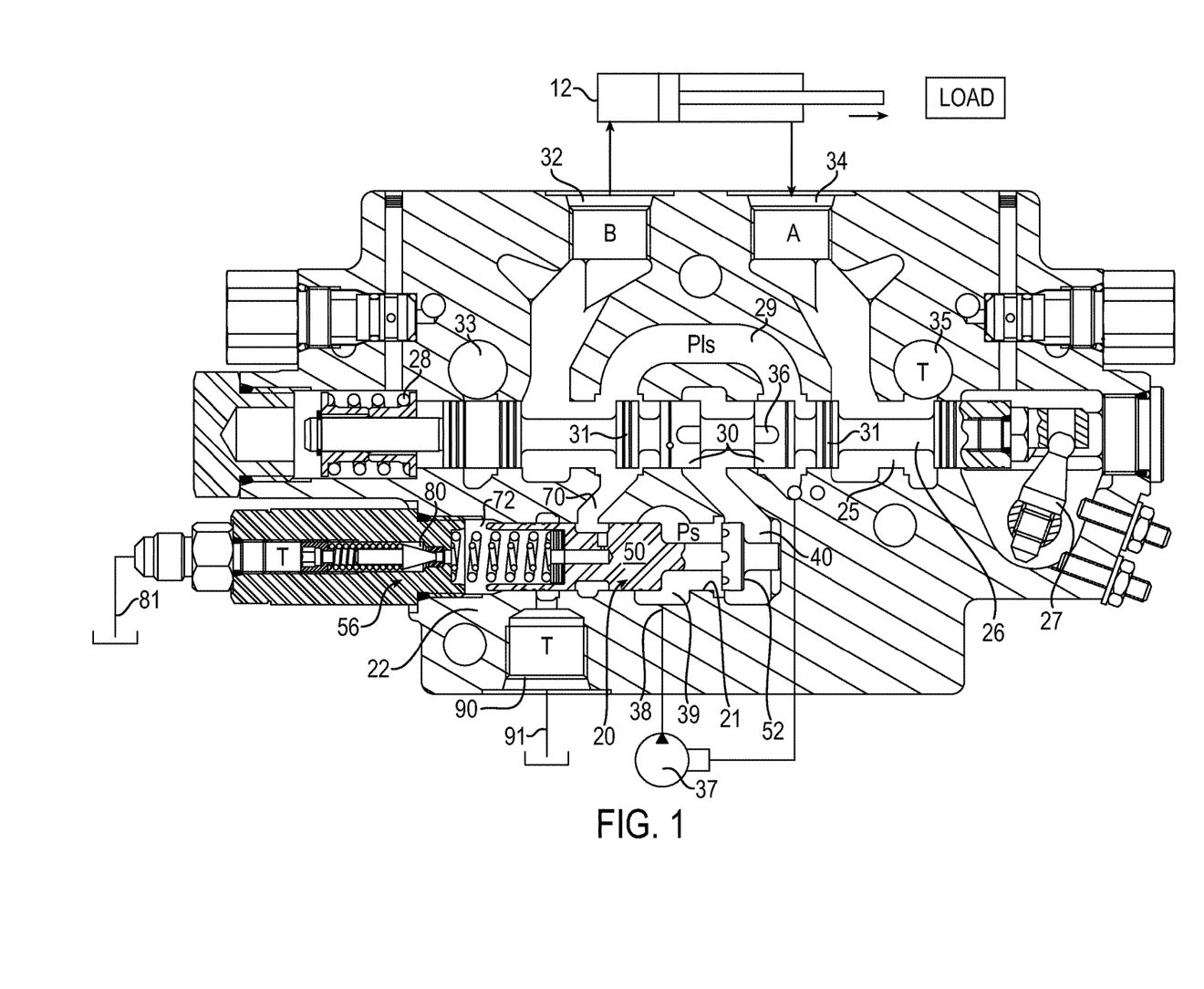
FIG. 1 is a cross-sectional view of an exemplary working valve section including an exemplary three-way valve according to the invention, in which a valve spool is in a position that enables full flow from the supply port to the work port, a pilot-operated pressure limiter valve is closed, and a pressure relief port is closed by the valve spool.

Referring now in detail to the drawings, and initially to FIG. 1, an exemplary three-way valve assembly 20 having a pressure control, flow regulator, and pressure relief valve function is shown within a valve body 22. In the illustrated embodiment, the valve body 22 includes or is part of a working valve section. The working valve section may be a unitary housing, or the working valve section may be segmented. The working valve section may be one of a plurality of individual sections that may be coupled together by fasteners in a known manner to provide a hydraulic valve assembly. The individual working valve sections may be positioned adjacent to one another, such as in abutting relationship, and those skilled in the art should recognize that any number of working sections may be included in the assembly of valve sections. The working valve sections of the valve section assembly may be the same as one another, or may be different from one another.

The valve body 22 has a fluid flow path that fluidly connects various passages and/or ports. The valve body 22 includes a longitudinally extending main flow control valve through-passage 25, or main spool bore, for receiving a main control spool 26 having a longitudinal axis. A first end of the main control spool 26 is adapted to be connected to an external input command device, which may be, for example, a lever 27, a handle or a joy stick that is manually operated by a human operator, a pilot signal, an electrical signal, solenoids, a computer program, a wireless signal, or any other suitable input that directly or indirectly causes operation of a valve. A second end of the main control spool 26 is acted upon by a biasing device 28, such as a spring, for returning the control spool to a neutral, closed position, all in a well-known manner.

A generally U-shaped chamber, or bridge passage 29, connects sides of the main spool 26 on either side of a feed passage 40. The main spool 26 has a pair of metering lands 30 which permit or restrict fluid communication between the feed passage 40 and the bridge passage 29. Additionally, main spool 26 has flow direction lands 31 which permit or restrict fluid communication between the bridge passage 29 and work ports 32 and 34. The work ports 32 and 34 extend generally radially into the valve body 22 relative to the longitudinal axis of the main control spool 26 (vertically in the orientation shown in FIG. 1) and fluidly connect with passages that intersect the through-passage 25. Movement of the main spool 26 either to the left or the right will permit selective communication between one of the work ports 32, 34 and the feed passage 40. When the main spool 26 is shifted, the cylinder port that does not receive fluid from the feed passage 40 communicates with an appropriate exhaust port 33 or 35. It should be noted that the control spool 26 in FIG. 1 is illustrated in a position moved longitudinally rightward away from its neutral position, to open a main valve variable area orifice 36, which enables communication between the feed passage 40 and the work port 32 so as to supply flow to a fluid operated device 12, such as an actuator or motor, for example.

The valve body 22 also includes a supply port 38 (shown schematically), or inlet passage, for receiving an inlet flow from a source 37, such as a pump (shown schematically), for example a fixed displacement hydraulic pump. In the illustrated embodiment, the supply port 38 is fluidly coupled to a supply passage 39, which is connected to the feed passage 40. The through-passage 25, the feed passage 40, and the bridge passage 29 provide a fluid flow path (illustrated in part by arrows in FIG. 3) extending between the supply port 38 and the work ports 32 and 34. Generally, the upstream side of the flow path includes those elements upstream of the main spool 26 and bridge passage 29, including the source 37, supply port 38, supply passage 39, and feed passage 40; and the downstream side of the flow path includes those elements downstream of the bridge passage 29, including the work ports 32, 34, the fluid operated device 12, a load sense passage 70, and other passages that will be described in further detail below.

Figure 2:
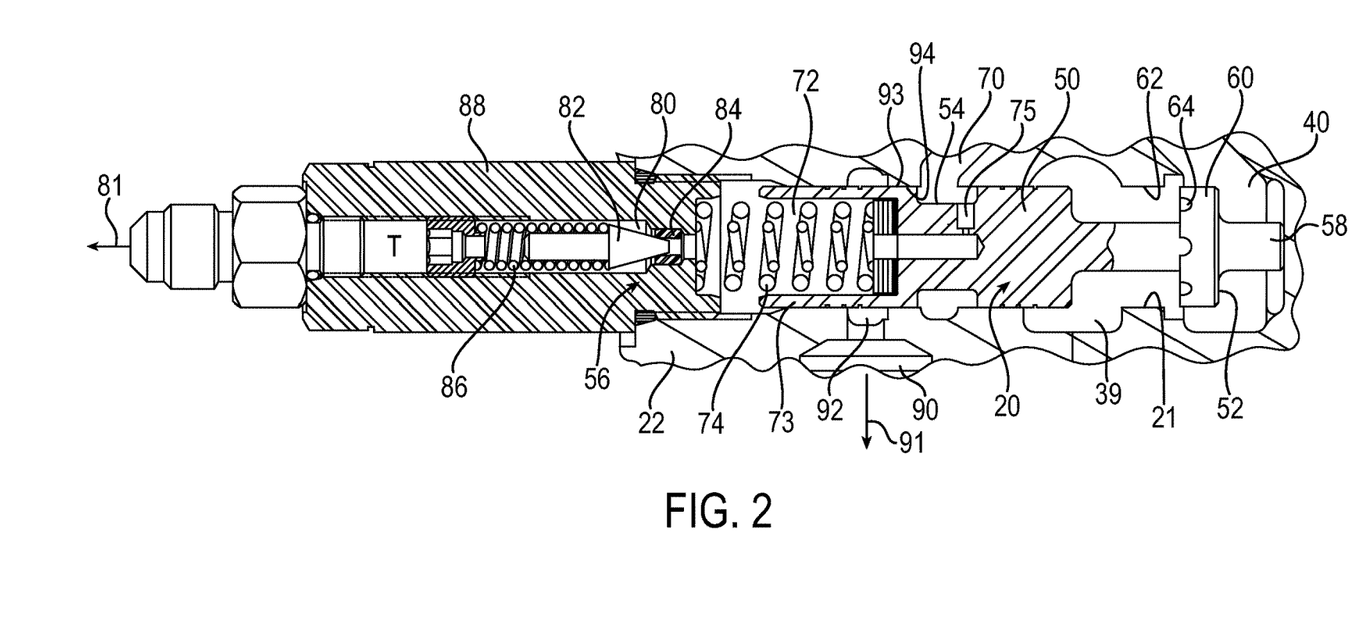
FIG. 2 is a close-up view of the exemplary three-way valve in FIG. 1.

Referring to FIGS. 1 and 2, the exemplary three-way valve 20 will be described in further detail. The three-way valve 20 includes a valve member 50 that is movable in the valve body 22 and which is disposed in the fluid flow path. In the illustrated embodiment, the valve member 50 is a unitary valve member which may provide a pressure compensating, pressure reducing, or pressure relieving valve function. A pilot-operated pressure limiter valve 56, which is shown toward an axial end of the valve member 50 in the illustrated embodiment, may also be disposed in the fluid flow path to cooperate with the valve member 50, as will be discussed in further detail below.

In the illustrated embodiment, the valve member 50 is configured as a valve spool slidably moveable within a spool bore 21 in the valve body 22. The valve spool 50 may include a metering edge that cooperates with a valve body metering edge to meter fluid flow from the supply port 38, across the main spool variable orifice 36 and bridge passage 29, to the work port 32. The valve spool 50 may include at least one land 60 having a radially outer sealing surface configured to engage a radially interior sealing surface 62 of the valve body. The radially interior sealing surface 62 of the valve body may be considered a valve body land which may define at least a portion of the spool bore. The radially interior sealing surface 62 of the valve body may be located between the supply passage 39 and the feed passage 40, and the radially outer sealing surface of the land 60 is configured to cooperate with the radially interior sealing surface 62 to meter fluid flow from the supply port 38 to the work port 32 based on a position of the valve spool 50 in the spool bore.

Figure 5:
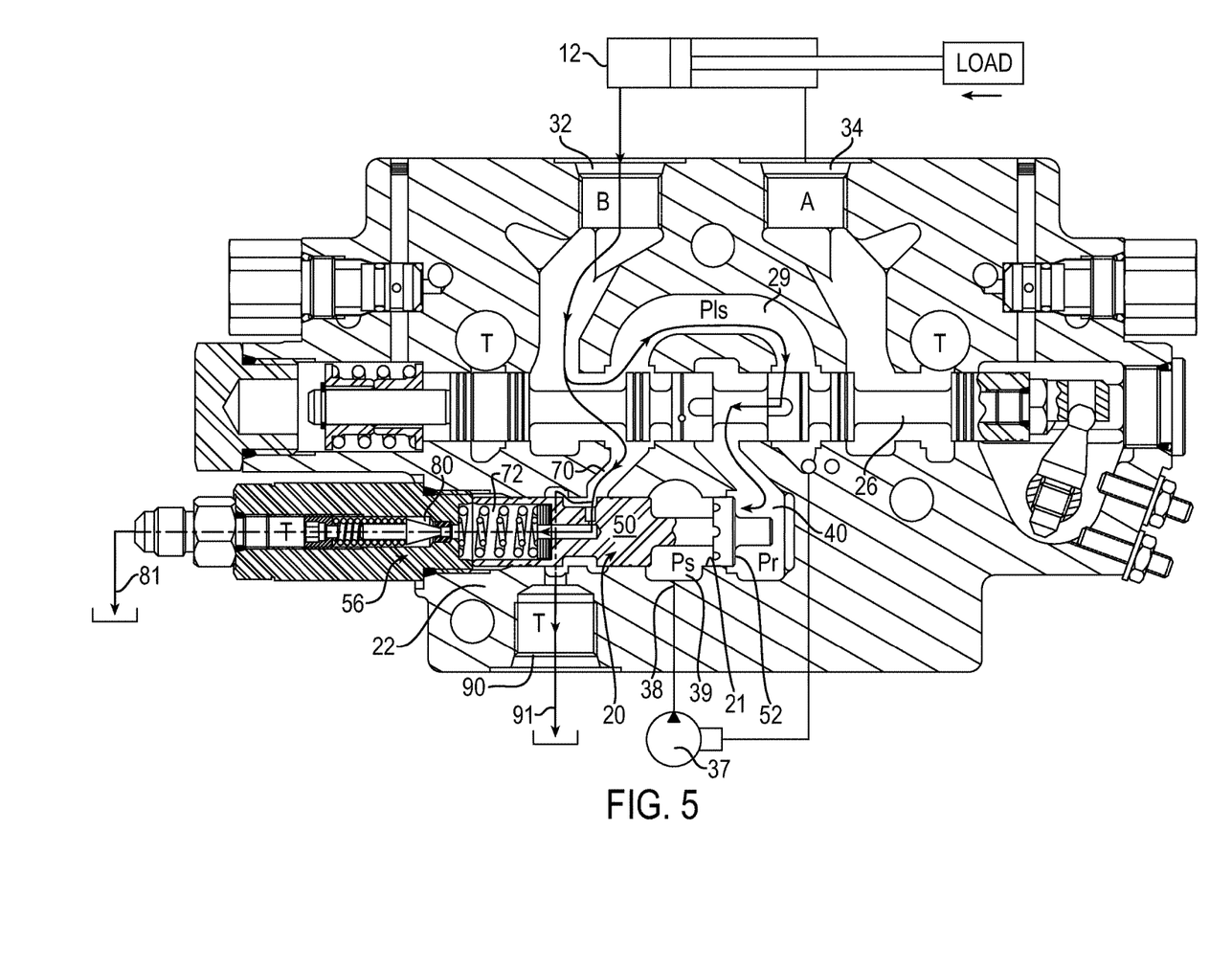
FIG. 5 is a is a cross-sectional view of the working valve section in FIG. 1, in which the pilot-operated pressure limiter valve remains open, and the valve spool is in a pressure relieving position for opening a flow path to the pressure relief port.

The valve spool 50 also includes a valve surface 52 being movable with the valve spool 50 and which is exposed to fluid pressure in the feed passage 40 upstream of the variable area orifice 36 of the main spool 26. The fluid pressure in the feed passage 40 acts on an opening radial surface area of the valve surface 52 exposed to that fluid pressure, which exerts a force on the valve spool 50 that urges the valve spool 50 toward a position in which the spool land 60 engages the valve body land 62 to close off fluid flow from the supply passage 39 to the feed passage 40 (as shown in FIG. 5, for example). In a fully-open position (as shown in FIG. 2, for example), an axial end of the valve spool 50 may engage an axial end of the spool bore 21 to prevent further movement of the valve spool 50. As the valve spool 50, including the spool land 60, moves within the flow path between the various positions, the valve spool 50 may regulate flow and control pressure of the fluid flowing from the source 37 through the valve body 22.

As shown in the illustrated embodiment, the spool land 60 may also include one or more axially extending metering notches, or metering slots, 64. The metering notches 64 may be configured for enabling some leakage flow from the supply passage 39 to the feed passage 40, even when the radially outer surface of the land 60 is engaged with the radially interior sealing surface 62 of the valve body. As will be described in further detail below, when the pilot-operated pressure limiter valve 56 is activated, the valve spool 50 may shift toward a position that pinches down fluid flow to the feed passage 40 at the metering slots 64. In this manner, the valve spool 50 becomes a pressure reducing valve that is capable of maintaining working pressure at a predetermined level that may be set by the pilot-operated pressure limiter valve 56.

The valve body 22 also includes a load sense passage 70 that is located downstream from the main spool variable area orifice 36 and the bridge passage 29. The load sense passage 70 is also in fluid communication with the work port 32. The load sense passage 70 enables communication of a pressure feedback signal that indicates the fluid pressure level at the work port 32 and/or the work side of the fluid operated device 12, which is communicated from the work port 32 to the valve member 50 via the load sense passage 70. In the illustrated embodiment, the load sense passage 70 is separated from the supply passage 39 by a second sealing surface of the valve member 50, such as a second valve spool land 66, that cooperates with an interior surface of the valve body 22, such as a valve body land 68, to sealingly engage and restrict fluid flow directly from the supply passage 39 to the load sense passage 70.

The load sense passage 70 may be fluidly connected to a load sense chamber 72 located downstream from the load sense passage 70. In the illustrated embodiment, a radially tubular wall 73 formed by the body of the valve member 50 defines at least a portion of the load sense chamber 72. The body of the valve member 50 may have a through-passage that fluidly couples the load sense passage 70 with the load sense chamber 72. The through-passage may include an orifice 75 in the radially outer surface of the valve member 50 which may be connected to one or more radial passages and/or axial passages.

The load sense chamber 72 is configured to transmit fluid pressure communicated from the load sense passage 70, and the pressure in the load sense chamber 72 exerts a force to the valve member 50 that tends to bias the valve spool 50, including the spool land 60 and valve surface 52, toward a position that enables flow from the supply passage 39 to the feed passage 40 (e.g., toward the right, as viewed in FIG. 1, for example). A biasing device 74, such as a spring or the like, may be disposed in the load sense chamber 72, or may be provided at an axial end of the valve member 50, so as to also provide a force that biases the valve spool 50 toward a position that enables flow from the supply passage 39 to the feed passage 40.

The fluid pressure in the load sense chamber 72 represents a downstream fluid pressure acting on the valve spool 50 that urges the valve member 50 in one direction (e.g., a position that enables flow from the supply port to the work port), and which opposes and counteracts the upstream fluid pressure in the feed passage 40 acting on the valve spool 50 that urges the valve spool 50 in the opposite direction (e.g., a position that restricts flow from the supply port to the work port). In this manner, the valve spool 50 may be exposed to fluid pressure at different locations in the fluid flow path and is configured to sense and regulate fluid pressure differentials in the flow path by balancing forces on both sides of the valve member 50 to act as a pressure compensator valve. Any one or more of the infinite positions in which the valve member acts as a pressure compensator valve for controlling flow and regulating fluid pressure differentials may be considered a first position of the valve member, or a pressure compensating position.

Still referring to FIGS. 1 and 2, the pilot-operated pressure limiter valve 56 is disposed in the fluid flow path between the load sense chamber 72 and a pressure limiter valve passage 80, which may be in fluid communication with a tank return line 81. The pilot-operated pressure limiter valve 56 is configured to regulate fluid pressure communicating with the load sense passage 70 and is adapted to open the flow path between the load sense passage 70 and the pressure limiter valve passage 80 when fluid pressure communicating with the load sense passage 70 (such as via the load sense chamber 72) reaches or exceeds a predetermined pressure level. For example, when the work port 32 pressure becomes greater than a predetermined pressure level set by the pilot-operated pressure limiter valve 56, the pilot-operated pressure limiter valve 56 may be activated to open the flow path enabling fluid to be vented to the reservoir or tank.

In response to this pilot flow, the fluid in the load sense chamber 72 may experience a pressure drop as it flows across the orifice 75, whereupon the valve spool 50 sensing this reduced pressure may then shift to the left to close off flow just enough to provide leakage across the metering notches 64 so as to satisfy the flow across the orifice 75 and through the pressure limiter valve passage 80 to maintain the desired pressure level at which the pilot-operated pressure limiter valve 56 is set. Any one or more of the infinite positions in which the valve member acts as a pressure reducer for effectively reducing fluid pressure to a predetermined pressure level set by the pilot-operated pressure limiter valve 56 may be considered a second position of the valve member, or a pressure reducing position.

In the illustrated embodiment, the pilot-operated pressure limiter valve 56 includes a poppet valve 82 having a tapered body that engages a valve seat 84 when the pilot-operated pressure limiter valve 56 is in a closed position. The pilot-operated pressure limiter valve 56 may also include a biasing device 86, such as a spring or the like, which biases the poppet valve 82 toward the closed position for restricting fluid flow from the load sense chamber 72 to the pressure limiter valve passage 80. The biasing device 86 may be interposed between the poppet valve 82 and an abutment within the pressure limiter valve passage 80. In addition, pilot-operated the pressure limiter valve 56 may be adjustable to set the predetermined pressure level at which the pilot-operated pressure limiter valve 56 is activated to open the fluid flow from the load sense chamber 72 to the pressure limiter valve passage 80. For example, the force exerted by the biasing device 86 may be adjusted in a well-known manner such that the force from fluid pressure in the load sense chamber 72 must exceed the biasing force before the pilot-operated pressure limiter valve 56 is activated.

The pressure limiter valve body 88 may be integral and unitary with the valve body 22, or the pressure limiter valve body 88 may be separable and attached to the valve body 22. In the illustrated embodiment, the pressure limiter valve body 88 is attached toward an axial end of the load sense chamber 72, such that the pressure limiter valve passage 80 is coaxial with the spool bore of the valve spool 50. In other embodiments, the pilot-operated pressure limiter valve 56 may be separate from the valve body 22 and fluidly coupled downstream from the load sense chamber 72. For example, the load sense chamber 72 may be bounded at its axial end with a port, outlet passage, and/or a plug having a through-passage, which may be fluidly connected to the pilot-operated pressure limiter valve 56 via fluid conduits or the like, for manual remote control of the reduced/relief pressure setting. Or the pilot-operated pressure limiter valve 56 may be replaced with an external electrohydraulic pilot-operated relief valve so the reducing/relieving pressure can be adjusted with an electronic input signal.

As shown in the exemplary embodiment in FIGS. 1 and 2, the valve member 50 also provides a pressure relief valve function by providing a valve surface disposed in the fluid flow path between the load sense passage 70 and a pressure relief port 90 (which may be in fluid communication with a tank return line 91). In particular, the valve spool 50 may be configured to open the flow path between the load sense passage 70 and the pressure relief port 90 when the fluid pressure communicating with the load sense passage 70 exceeds the predetermined pressure level provided by the pilot-operated pressure limiter valve 56, thereby reducing the fluid pressure in the valve body 22 to an acceptable level.

In the illustrated embodiment, the valve spool 50 includes a radially outer sealing surface 93 configured to engage a radially interior sealing surface 94 of the valve body. The radially outer sealing surface 93 of the valve spool may be configured as another valve spool land, which may define the radially outer surface of the tubular wall 73 enclosing at least a portion of the load sense chamber 72. The radially interior sealing surface 94 of the valve body may be configured as another valve body land which may define at least a portion of the spool bore 21. In the illustrated embodiment, the radially interior sealing surface 94 of the valve body is located between the load sense passage 70 and a pressure relief passage 92, and the radially outer sealing surface 93 of the valve spool is configured to cooperate with the radially interior sealing surface 94 of the valve body to permit or restrict fluid flow from the load sense passage 70 to the pressure relief port 90 based on the position of the valve spool 50 in the spool bore 21. For example, the valve spool 50 may abut the sealing surface 94 in one position to prevent flow between the load sense passage 70 and the pressure relief passage 92. The spool 50 may include an undercut 54, or groove, which extends axially along the spool bore axis. The undercut 54 may be wider than the valve body land 94 to allow fluid flow from the load sense passage 70 to the pressure relief passage 92 and to the pressure relief port 90 when the spool 50 is forced into a pressure relieving position, as will be described in further detail below. Optionally, the radially outer sealing surface 93 may also include axially extending notches or slots (similar to metering notches 64), which may be configured for enabling flow from the load sense passage 70 to the pressure relief passage 92, which may enable improved stability during operation of the device.

By providing the same valve member 50 in the fluid flow path to provide a pressure compensation function, a pressure reducing function, and a pressure relief function, the three-way valve 20 may effectively regulate fluid flow in the flow path of the valve body 22 while controlling and/or limiting fluid pressure to reduce damage or catastrophic failure under detrimental operating conditions.

More particularly, such a valve configuration may reduce the number of associated components required to achieve the desired functions, and may therefore reduce the complexity and overall cost of the valve assembly, among other considerations. Furthermore, by providing a single pilot-operated pressure limiter valve 56, any adjustment that is made to the pressure level will simultaneously move both the reduced and relief setting to the same new pressure level.

Figure 3:
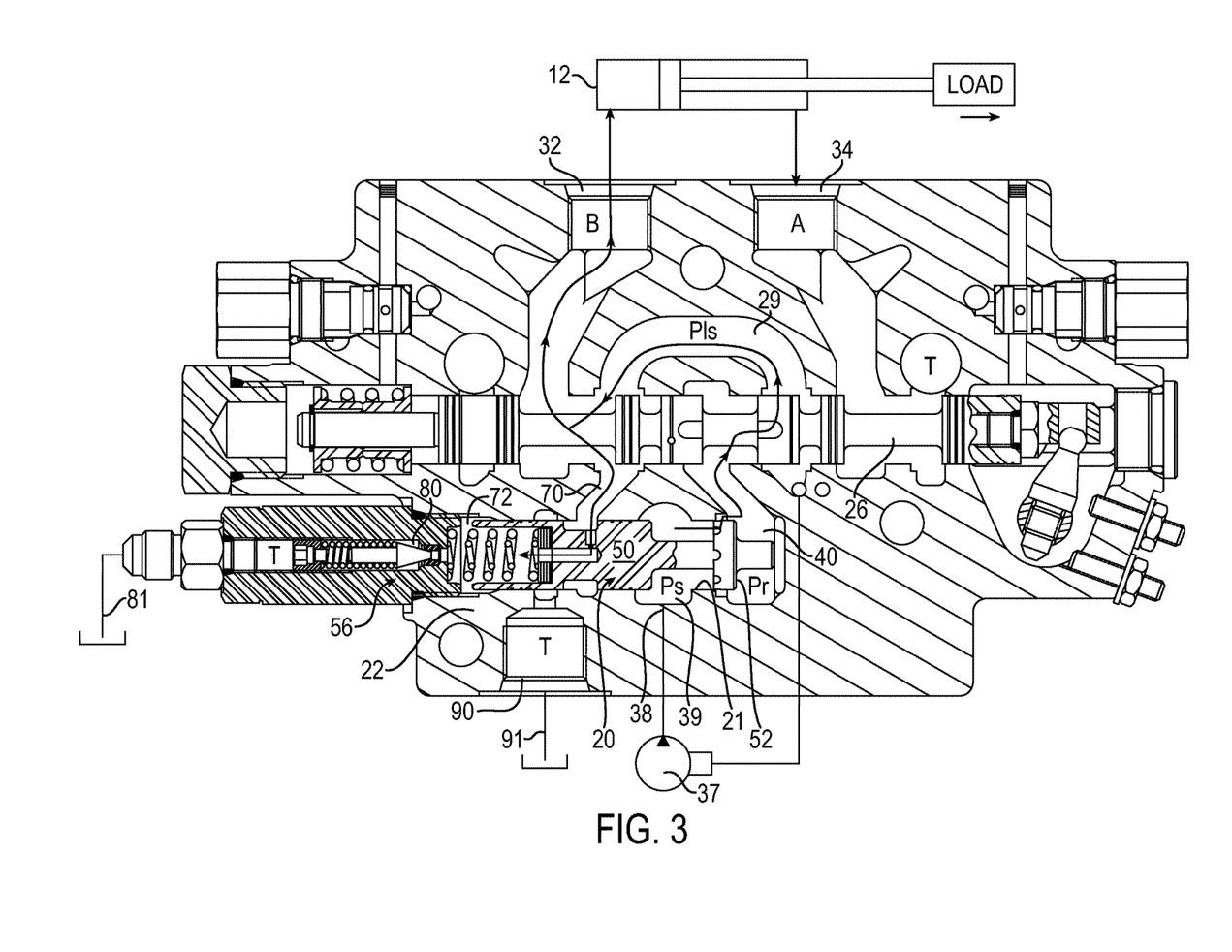
FIG. 3 is a is a cross-sectional view of the working valve section in FIG. 1, in the valve spool is in a flow regulating position, the pilot-operated pressure limiter valve is closed, and the pressure relief port is closed by the valve spool.
Figure 4:
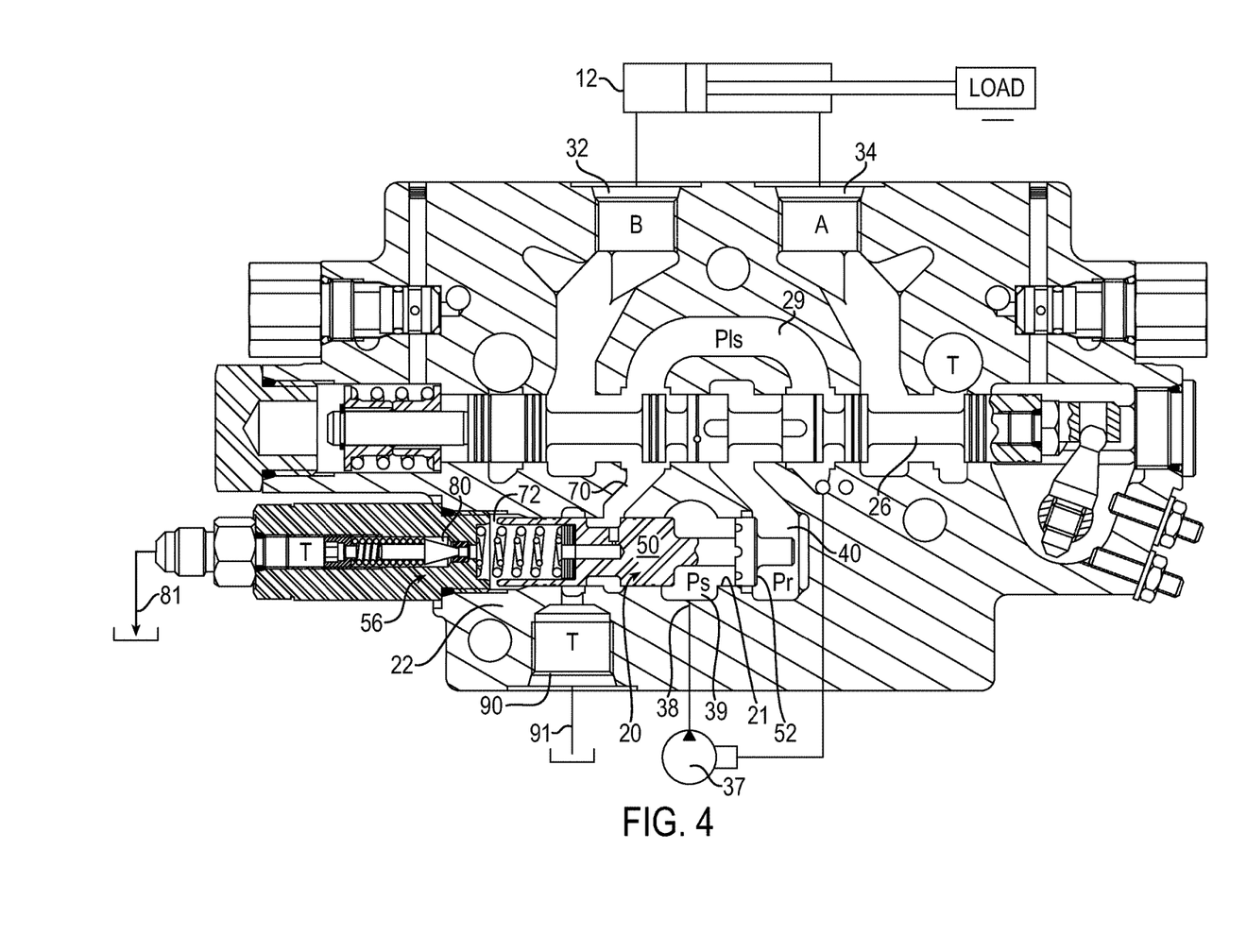
FIG. 4 is a is a cross-sectional view of the working valve section in FIG. 1, in which the pilot-operated pressure limiter valve is open, the valve spool is in a pressure reduced position, and the pressure relief port is closed by the valve spool.

Referring to FIGS. 1-5, an exemplary operation of the three-way valve 20 and method of regulating fluid flow and controlling fluid pressure in the valve body 22 will be described in further detail. Generally, FIG. 1 illustrates a state in which flow is provided to the fluid operated device, but no higher load is sensed in another section, and the valve spool 50 is in a fully-open position to allow flow from the supply passage 39 to the feed passage 40; and in which the pilot-operated pressure limiter valve 56 is closed and the valve spool 50 is blocking flow to the pressure relief port 90. FIG. 3 illustrates a state when the pump pressure is much higher than the load on the fluid operated device or work port is sensed and the valve spool 50 is shifted to a partially open regulated position to regulate flow and control pressure. FIG. 4 illustrates a state when a deadhead condition occurs, for example, and an increase in fluid pressure in the valve body causes the pilot-operated pressure limiter valve 56 to activate and open the flow path to the pressure limiter valve passage 80, whereupon the valve spool 50 shifts to a position that allows just enough leakage flow past the metering notches 64 to maintain a pressure level set by the pilot-operated pressure limiter valve 56. FIG. 5 illustrates a state when the load drives the fluid operated device 12 in reverse, causing fluid to flow back through the work port 32, which increases the fluid pressure to a level above the predetermined threshold provided by the pilot-operated pressure limiter valve 56 and causes the valve spool 50 to shift to a position where the valve spool 50 opens flow from the load sense passage 70 to the pressure relief port 90 to allow fluid venting to the tank or reservoir.

Generally during operation, the main control spool 26 may be moved either leftward or rightward, as viewed in FIG. 1, from its neutral position by the input command device. FIG. 1 illustrates the control spool 26 shifted rightward from its neutral position and, as a result, a seat member of the biasing means 28 is forced a short distance away from a corresponding seating wall. When the control spool 26 is shifted rightward in the manner as illustrated in FIG. 1, hydraulic fluid enters the valve body 22 from the source 37 through the supply port 38 and then flows into the supply passage 39. In the state shown in FIG. 1, the valve spool 50 is fully open and fluid from the supply passage 39 flows across the spool land 60 and the valve surface 52 into the feed passage 40 and then into a center spool gallery of the through-passage 25.

A movable valve surface of the land 30 of spool 26 cooperates with an adjacent stationary valve surface at the intersection of the through-passage 25 and center spool gallery to define the variable area orifice 36. Fluid flows across the variable area orifice 36 of the main spool 26 and then through the bridge passage 29. The amount of fluid flowing from the center spool gallery of the through-passage 25 to the bridge passage 29 varies depending upon the position of the control spool 26 (which controls the area of the variable area orifice 36) and the pressure of the fluid. As a result, a pressure drop occurs as the fluid flows from the feed passage 40, through the main control valve variable area orifice 36, and across the bridge passage 29. Thus, the fluid pressure in the bridge passage 29 is typically less than the pressure in the feed passage 40 whenever there is fluid flow through the valve body 22.

The fluid flow (as illustrated by the arrows in FIG. 3, for example) continues through the bridge passage 29 and is directed through a passage to its associated work port 32 or 34. In the example shown in FIG. 3, the fluid is directed to the first work port 32. The fluid is then directed through its associated fluid conduit to its associated fluid operated device 12, such as an actuator. At the same time, fluid flow returning from the associated fluid operating device is directed into the second work port 34, through another passage and to the tank return passage 35. The valve body working section works in a similar manner when the spool is moved leftward from its neutral position for directing fluid to the second work port 34 and receiving return fluid in the first work port 32.

The fluid flow from the bridge passage 29 also continues to the load sense passage 70, which establishes fluid communication with the work port 32. In addition, fluid from the load sense passage 70 flows into the load sense chamber 72 (via fluid orifice 75, for example) and also establishes communication with the valve spool 50. This enables the feedback signal from the work port 32 to communicate with the valve spool 50 to control pressure and regulate flow from the source 37 by moving the valve spool 50, including the spool land 60 and valve surface 52, in the flow path between the supply passage 39 and the feed passage 40.

When the main directional control spool 26 is shifted (as shown in FIG. 1, for example), load pressure from the work port 32 is transmitted to the load sense chamber 72, which in the illustrated embodiment is enclosed at least partially by the valve spool 50 and contains a biasing member 74. As the main spool 26 opens its metering area flow direction along land 30, the load pressure will be sensed in the load sense chamber 72. The load pressure acting in the load sense chamber 72 will act against the end of the valve spool 50, causing the valve spool metering land 60 to open away from the valve body land 62 (toward the right as viewed in FIG. 2). As the regulator land 60 opens, the increasing flow to the main spool 26 will result in an increasing pressure drop across the main spool area opening at metering land 30. When the pressure drop across the main spool 26 is equal to the force from the biasing member 74 (e.g., spring force) acting on the end of the valve spool at surface 52, then the valve spool 50 will modulate around its steady state position.

This state of equilibrium is created, in part, by the load pressure acting in the load sense chamber 72 on one side of the valve spool 50, combined with the biasing member 74 pre-load force. These combined forces cause the spool 50 and metering land 60 to move to a position opening the flow path between the supply chamber 39 and the feed passage 40, and these combined forces are equally opposed by regulated pressure in the feed passage 40 acting on the opening radial surface area of the valve surface 52 exposed to that fluid pressure.

The opposing force caused by fluid pressure in the feed passage 40 is a feedback force exerted on the valve surface 52 that is used to move the spool 50 and metering land 60 toward the second position as flow and the pressure drop across the main spool 26 increase beyond the pre-load force of the bias member 74. The regulated/feedback pressure in the feed passage 40 is upstream of the main spool variable area orifice 36 and bridge passage 29, making it a higher pressure than the load pressure in the downstream load sense passage 70 due to the pressure drop across the main spool 26. Therefore, the pressure drop across the main spool 26 will equal the biasing member 74 pre-load force acting on the valve spool 50 since the load pressure in the load sense chamber 72 in addition to the pre-load force will collectively equal the regulated pressure in the feed passage 40.

The spool metering land 60 will position itself within the flow path between the supply passage 39 and the feed passage 40 to allow for the forces on opposite sides of the valve spool 50 to become balanced, and the metering land 60 will automatically adjust its position within the feed passage 40 as the main spool metering area along metering land 30 changes and/or as the load pressure or supply fluid pressure to the valve spool 50 itself changes. The feedback surface 52 at the end of the spool 50 may be a part of the metering land 60 that throttles the supply pressure from the supply passage 39 to the regulated pressure in the feed passage 40. As the supply fluid pressure is throttled down to a lower "regulated" pressure, the fluid may flow around the metering land 60 of the spool 50, or through metering notches 64 (as shown in FIG. 3, for example), to act directly on the exposed radial surface area of the valve surface 52 at the end of the spool 50. The regulated pressure creates a feedback force directly on this valve surface 52 of the spool 50 as the fluid flows to the main spool area opening at metering land 30. In this manner, the valve spool 50 operates as a pressure compensator valve that controls flow and regulates fluid pressure sensed in the flow path of the valve body.

Referring to FIG. 4, and discussed above, the valve member 50 may also act as a maximum segment pressure limiter or reducing valve that cooperates with the pilot-operated pressure limiter valve 56. For example, a deadhead condition may occur when flow is directed toward the fluid operating device and movement of the device in response to the flow is somehow restricted or stopped, which may cause an increase in the pressure level at the work port 32 and/or the valve body 22. When the work port 32 pressure communicated to the load sense chamber 72 reaches or exceeds a predetermined or selected pressure level that the biasing member 86 holding the check valve element closed can support, the pilot-operated pressure limiter valve 56 may be activated (e.g., moved to an open position spaced from the valve seat) to open the flow path from the load sense chamber 72 to a reservoir or tank, for example, via the pressure limiter valve passage 80.

The orifice 75 located in the communicating line between the main spool load sensing passage 70 and the regulator spool load sensing chamber 72 may provide for a pressure drop to be taken across the orifice 75 when the pilot-operated pressure limiter valve 56 is cracked open to its preset value, which lowers the fluid pressure in the load sense chamber 72. Once the pressure drop across the orifice 75 in the load sense chamber 72 exceeds the pre-load force of the biasing member 74 on the valve spool 50, the valve spool 50 will shift to close off flow to the main spool 26 and will create just enough leakage flow between spool land 60 and valve body land 62, such as via the metering notches 64, to satisfy the flow across the orifice 72 and across the poppet 82 to maintain a pressure level at which the pilot limiter was set. This may be done to limit or reduce the maximum pressure in the valve body, or to maintain a fixed clamping force on a cylinder, or a fixed torque on a rotary motor.

Referring to FIG. 5, and as discussed above, the valve member 50 may also act as a pressure relief valve that acts to open or close the flow path to a pressure relief port 90 by providing a valve surface of the valve member 50 upstream from the pressure relief port 90. For example, the valve spool 50 may be configured to open the flow path between the load sense passage 70 and the pressure relief port 90 (via the pressure relief passage 92 extending across the spool 50) for venting pressurized fluid to tank, thereby preventing fluid pressure communicating with the load sense passage 70 from exceeding a pressure level that is greater than the predetermined pressure level set by the pilot-operated limiter pressure limiter valve 56.

By way of a non-limiting example, as shown in FIG. 5, when a fluid operated device 12 is moving against a load, or is deadheaded against a load, and then suddenly the fluid operated device 12 is overcome by an increased load such that the fluid may flow back through the work port 32 (as shown with arrows), the pressure level in the valve body 22 may increase to a level beyond the pilot-operated pressure limiter valve 56. In the exemplary scenario, the work port 32 pressure communicated to the load sense chamber 72 via the load sense passage 70 may exceed the predetermined or selected pressure level that activates the pilot-operated pressure limiter valve 56, thereby opening the flow path to the pressure limiter valve passage 80 and causing a pressure drop in the load sense chamber 72 across the orifice 75, which lowers the fluid pressure in the load sense chamber 72, resulting in a decreased force acting on that end of spool 50, as discussed above.

Also in the exemplary scenario, the reversal of flow in the flow path of the valve body 22 may increase the fluid pressure in the feed passage 40, which will exert an increased force on the valve surface area 52 which biases the valve spool 50 toward a position in which the spool land 60 (and optionally metering notches 64) may completely close flow between the supply passage 39 and the feed passage 40. When the flow between the supply passage 39 and the feed passage 40 is closed in this manner, the flow through the pilot-operated pressure limiter valve 56 may instead be satisfied by the backflow through the work port 32 rather than from the source 37. The shift of the valve spool 50 to this position also causes the spool land having sealing surface 93 (or other pressure relief valve surface) to move with the valve spool 50 to a position in which the flow path from the load sense passage 70 to the pressure relief port 90 is opened for venting fluid to tank, thereby relieving pressure in the valve body 22. As shown in FIG. 5, for example, the valve spool 50 is shifted to a position in which the spool sealing surface 93 disengages from the valve body sealing surface 94 such that the undercut 54 straddles the valve body sealing surface 94 to allow fluid flow from the load sense passage 70 to the pressure relief passage 92 and to the pressure relief port 90. The orifice 75 may be disposed on the undercut 54 to enable flow from the load sense passage 70 to the load sense chamber 72 after the spool 50 is shifted to such a pressure relieving position.

In other words, after the pilot-operated pressure-limiter valve 56 is activated and there is a pressure drop in the load sense chamber 72 across the orifice 75, the valve spool 50 may move toward a position for opening the flow path from the load sense passage 70 to the pressure relief port 90 when the fluid pressure in the feed passage 40 (which urges the valve spool to the left in FIG. 5) exceeds the combined forces from the reduced fluid pressure in the load sense chamber 72 and the force from the biasing device 74 (which urges the valve spool to the right in FIG. 5). Any one or more of the infinite positions in which the valve member acts as a pressure relief valve for relieving fluid pressure in the flow path when the fluid pressure exceeds the predetermined pressure level set by the pilot-operated pressure limiter valve 56, may be considered a third position of the valve member, or a pressure relieving position. As would be understood by those skilled in the art, the three-way valve 20 may be adapted to provide such pressure relief at a prescribed pressure level above the predetermined pressure level provided by the pilot-operated pressure limiter valve 56 setting through suitable configuration of the associated components or other externally plumbed components.

Such an exemplary three-way valve as described herein may provide pressure compensation for controlling flow and regulating differences in fluid pressure sensed in a flow path of a valve body, may provide pressure reduction for effectively limiting or reducing fluid pressure in the flow path to a predetermined pressure level set by cooperating pilot-operated pressure limiter valve, and may provide pressure relief for relieving fluid pressure in the flow path when the fluid pressure in the flow path reaches or exceeds the predetermined pressure level set by the pilot-operated pressure limiter valve, for example, when a deadhead condition occurs and then flow is inadvertently reversed in the flow path.

Figure 6:
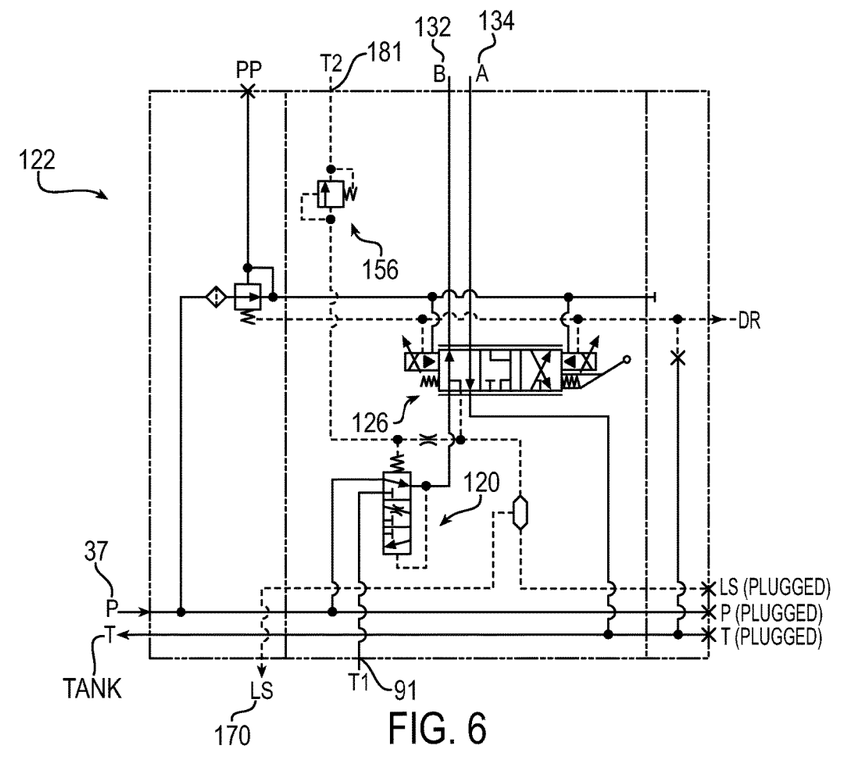
FIG. 6 is a schematic circuit diagram of the state of the valve section in FIG. 3.
Figure 7:
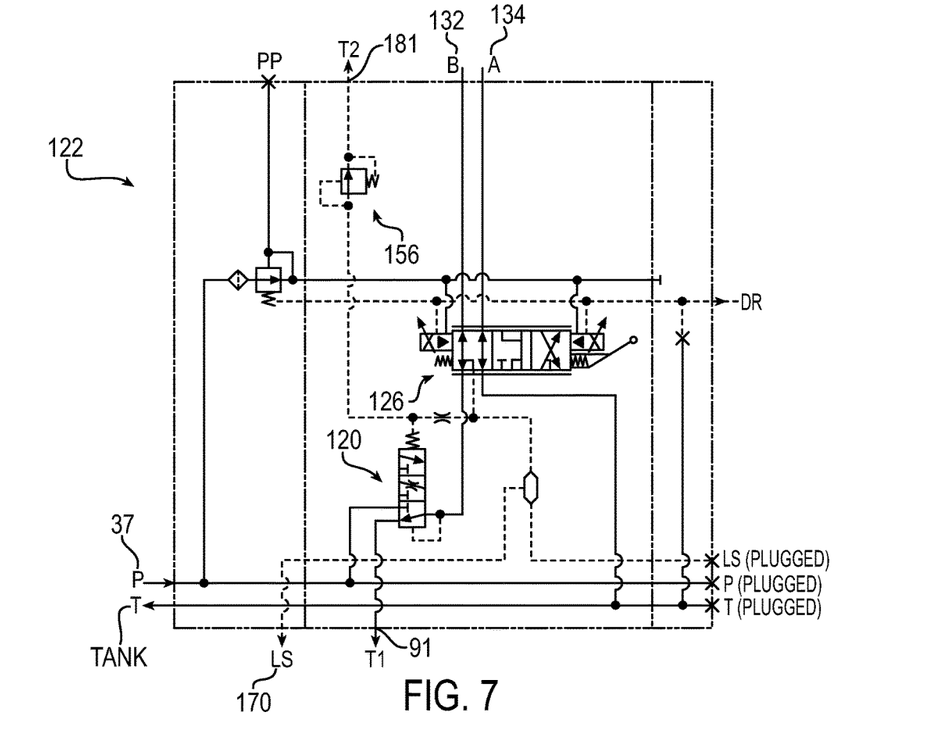
FIG. 7 is a schematic circuit diagram of the state of the valve section in FIG. 5.

Turning now to FIGS. 6 and 7, schematic diagrams of valve sections constructed generally in accordance with the previous description are shown. The reference numbers indicated in FIGS. 6 and 7 are substantially the same as the reference numbers used in FIGS. 1-5, and consequently the same reference numerals but indexed by 100 are used to denote structures corresponding to substantially the same or similar structures in the three-way valve 20. As such, the foregoing description of the three-way valve 20 is equally applicable to the three-way valve 120. FIG. 6 illustrates a state when a load on the fluid operated 12 device or work port is sensed and the valve spool 50 is shifted to regulate flow and control pressure, which corresponds with FIG. 3 above. FIG. 7 illustrates a state when the valve spool 50 is shifted to the pressure relieving position where the valve spool 50 opens flow to the pressure relief port 90 to allow fluid venting to the tank or reservoir, which corresponds with FIG. 5.

Figure 8:
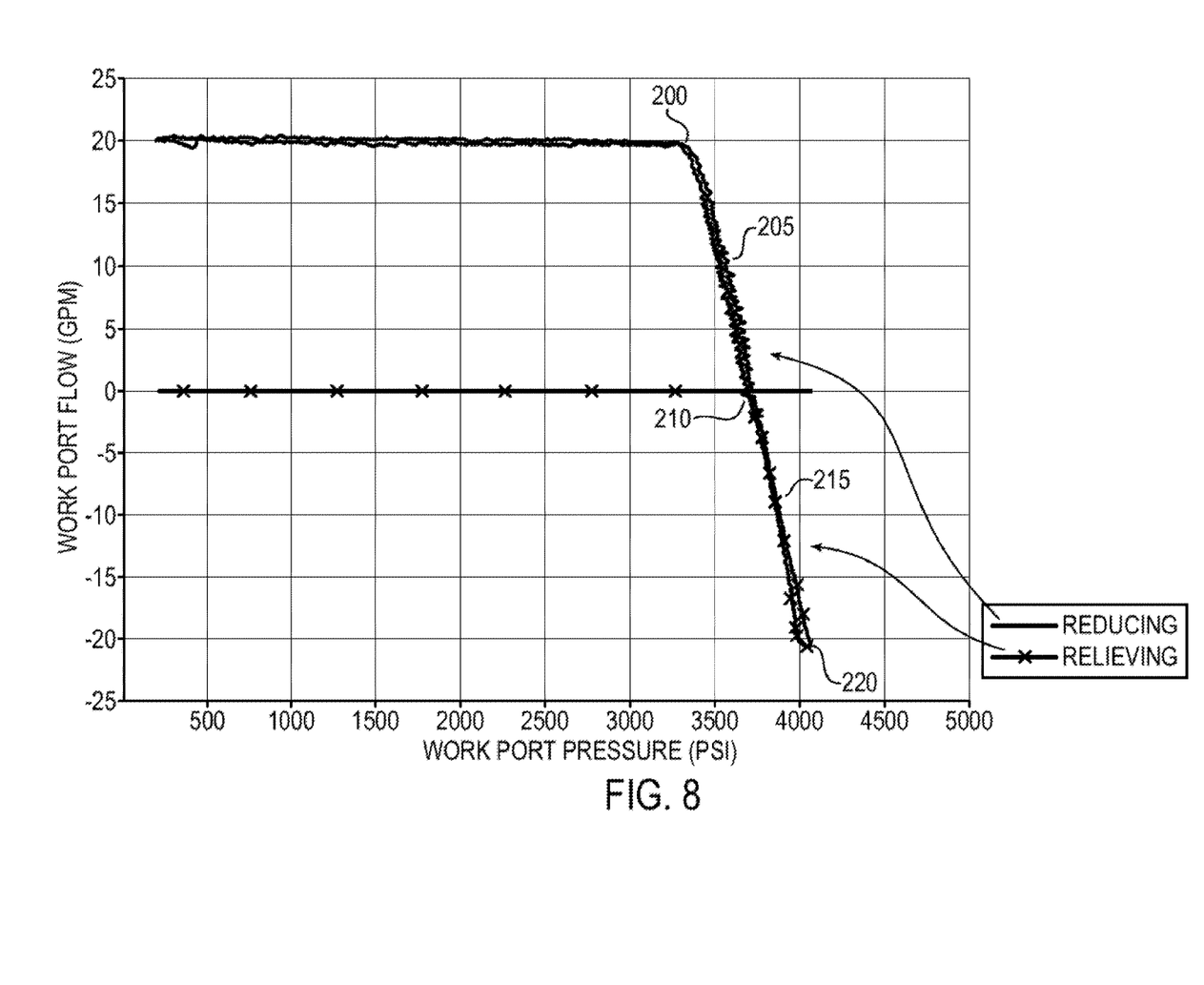
FIG. 8 is a graph illustrating work port flow (gpm) versus work port pressure (psi) of an exemplary three-way pressure control valve according to the invention.

Referring now to FIG. 8, a graph illustrating work port flow (gpm) versus work port pressure (psi) of a three-way valve according to the previous description during experimental operation is shown. In the illustrated example, the pump provides 30 GPM of flow to the valve body and the work port is provided with about 20 GPM of flow up to a fluid pressure of about 3300 psi, which is indicated at reference number 200. At this point indicated by reference number 200, the pilot-operated pressure limiter valve activates and the three-way valve spool is shifted to reduced flow to the work port, which is indicated at reference number 205 as "reducing," and which corresponds generally with the state in FIG. 4. The predetermined pressure level threshold set by the pilot-operated pressure limiter valve in this example is about 3700 psi, as indicated at reference number 210, where work port flow is at or near zero. As the flow in the work port is reversed, as shown with negative work port flow on the y-axis and indicated at reference number 215 and corresponding generally with the state in FIG. 5, the three-way valve spool is shifted to close flow from supply to the work port, and to open flow to the pressure relief port. In this region indicated by reference number 215, the pressure in the valve body is being relieved across the three-way valve spool and vented to the tank. The three-way valve spool is shifted to a position in which the pressure relief flow path is open at the point indicated by reference numeral 220. Further relief flow would result if the load pressure was higher. In this case, the three-way valve spool would shift open further or the pressure drop across the fully opened three-way valve spool would increase.

Although the invention has been shown and described with respect to a certain embodiment or embodiments, it is obvious that equivalent alterations and modifications will occur to others skilled in the art upon the reading and understanding of this specification and the annexed drawings. For example, although the three-way valve was shown in a pre-compensated configuration, the three-way valve could also be used in a post-compensated configuration, as would be understood by those skilled in the art. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A three-way valve assembly comprising:
   a valve body having a fluid flow path, a supply port for receiving fluid flow into the valve body, and a work port for delivering fluid flow from the valve body;
   a valve member movable in the valve body and being disposed in the fluid flow path between the supply port and the work port, and between a load sense passage and a pressure relief port, the valve member having a first valve surface exposed to fluid pressure upstream of the load sense passage and an opposite second valve surface exposed to fluid pressure downstream of the load sense passage;
   wherein, when fluid flows into the valve body from the supply port and out of the valve body through the work port in a first direction, the valve member is configured to move in the fluid flow path to control pressure and regulate fluid flow from the supply port to the work port in response to the differences in upstream and downstream fluid pressure exerted on the respective first and second valve surfaces of the valve member; and
   wherein, when fluid flows into the valve body through the work port in a direction opposite the first direction, fluid pressure from the opposite direction of fluid flow is exerted on the respective first and second valve surfaces of the valve member, and in response to the fluid pressure acting on the first valve surface by a predetermined amount greater than the fluid pressure acting on the opposite second valve surface, the valve member is configured to move to a pressure relieving position in which the valve member is configured to open the flow path from the load sense passage to the pressure relief port for relieving fluid pressure in the valve body.

2. The three-way valve assembly according to claim 1, wherein the valve member has a sealing surface configured to cooperate with a valve body sealing surface to permit or restrict fluid flow from the load sense passage to the pressure relief port.

3. The three-way valve assembly according to claim 1,
   wherein the valve member is configured as a valve spool slidably moveable within a spool bore in the valve body;
   wherein the valve spool includes at least one land having a radially outer sealing surface configured to engage a radially interior sealing surface of the valve body which defines at least a portion of the spool bore;
   wherein the radially interior sealing surface of the valve body is located between the load sense passage and a pressure relief passage that is fluidly connected to the pressure relief port; and
   wherein the radially outer sealing surface of the valve spool is configured to cooperate with the radially interior sealing surface of the valve body to permit or restrict fluid flow from the load sense passage to the pressure relief port.

4. The three-way valve assembly according to claim 3, wherein the valve spool includes an undercut extending axially along the valve spool, the undercut being located proximal the radially outer sealing surface of the valve spool on an upstream side from the radially outer sealing surface; and
   wherein the pressure relief passage extends across the undercut when the valve spool is in the pressure relieving position for enabling fluid flow from the load sense passage to the pressure relief port.

5. The three-way valve assembly according to claim 1, wherein the valve member is configured to move in the flow path between a pressure compensating position and a pressure reducing position for controlling pressure and regulating fluid flow from the supply port to the work port in response to the differences in upstream and downstream fluid pressure exerted on the opposite first and second valve surfaces of the valve member; and
   wherein, when the valve member is in the pressure reducing position, the valve member is configured to close the flow path from the load sense passage to the pressure relief port.

6. The three-way valve assembly according to claim 5, further including a load sense chamber fluidly coupled to the load sense passage, and a feed passage in fluid communication with the supply port;
   wherein the feed passage is located upstream from the load sense passage, and fluid pressure in the feed passage exerts a force on the first valve surface that biases the valve member toward the pressure reducing position; and wherein the load sense chamber is located downstream from the load sense passage, and fluid pressure in the load sense chamber exerts a force on the opposite second valve surface that biases the valve member in an opposite direction from the pressure reducing position and toward the pressure compensating position.

7. The three-way valve assembly according to claim 6, wherein a biasing device is disposed in the load sense chamber which exerts a force that biases the valve member in a direction opposite from the pressure reducing position and toward the pressure compensating position; and
wherein the position of the valve member is determined at least in part by the difference in forces exerted on the valve member by the fluid pressure in the feed passage, which biases the valve member in one direction, and the combined forces from fluid pressure in the load sense chamber and the force exerted by the biasing device, which biases the valve member in the opposite direction.

8. The three-way valve assembly according to claim 5, wherein the valve member is configured as a valve spool slidably moveable in a spool bore, the valve spool having a flow metering portion for regulating flow of pressurized fluid from the supply port to the work port based on the position of the valve spool in the spool bore.

9. The three-way valve assembly according to claim 6, wherein a body of the valve member defines at least a portion of the load sense chamber;
wherein the body of the valve member separates the load sense passage and the load sense chamber, and wherein the body of the valve member has a through-passage that enables the load sense passage to be fluidly coupled to the load sense chamber.

10. The three-way valve assembly according to claim 5, further comprising a pilot-operated pressure limiter valve exposed to fluid pressure downstream from the load sense passage, the pilot-operated pressure limiter valve being configured to open when the downstream fluid pressure acting on the pilot-operated pressure limiter valve exceeds a predetermined pressure level.

11. The three-way valve assembly according to claim 10, wherein, when the pilot-operated pressure limiter valve is opened, the upstream fluid pressure acting on the valve member moves the valve member to the pressure reducing position in which flow from the supply port to the work port is regulated by the valve member to satisfy the pilot flow through the pilot-operated pressure limiter valve so as to reduce fluid pressure in the flow path to the predetermined pressure level.

12. The three-way valve assembly according to claim 11, further including a load sense chamber fluidly connected to the load sense passage;
wherein the pilot-operated pressure limiter valve includes a pressure limiter valve member exposed to the fluid pressure in the load sense chamber which urges the pressure limiter valve member toward an open position.

13. The three-way valve assembly according to claim 12, wherein the pilot-operated pressure limiter valve includes a pressure limiter valve passage that is fluidly coupled to the load sense chamber, and the pressure limiter valve member is movable within the flow path between the load sense chamber and the pressure limiter valve passage for opening and closing the fluid flow path therebetween.

14. The three-way valve assembly according to claim 13, wherein the pressure limiter valve member moves to an open position for enabling pilot flow from the load sense chamber to the pressure limiter valve passage when the pressure level in the load sense chamber exceeds the predetermined pressure level.

15. The three-way valve assembly according to claim 12, wherein the valve member separates the load sense passage from the load sense chamber, and the valve member has an orifice that fluidly couples the load sense chamber to the load sense passage.

16. The three-way valve assembly according to claim 15, wherein, when the pilot-operated pressure limiter valve is opened, a pressure drop is taken across the orifice which reduces fluid pressure in the load sense chamber causing the valve member to shift to the pressure reducing position or the pressure relieving position.

17. The three-way valve assembly according to claim 13, wherein the pilot-operated pressure limiter valve includes a biasing device acting against the pressure limiter valve member to bias the pressure limiter valve member toward a closed position for restricting fluid flow from the load sense chamber to a pressure limiter valve passage; and
wherein the biasing device is adjustable to set the predetermined pressure level at which the pressure limiter valve moves toward an open position.

18. The three-way valve assembly according to claim 17, wherein the pressure limiter valve member includes a sealing surface configured to engage a valve seat;
wherein the biasing device acting on the pressure limiter valve member exerts a force that biases the pressure limiter valve member toward the closed position in which the sealing surface engages the valve seat and prevents flow from the load sense chamber to the pressure limiter valve passage; and
wherein fluid pressure in the load sense chamber exerts a force on the pressure limiter valve member opposing the force from the biasing device and which urges the pressure limiter valve toward an open position enabling fluid flow from the load sense chamber to the pressure limiter valve passage.

19. A three-way valve assembly comprising:
a valve body having a fluid flow path;
a valve spool slidably movable within a spool bore in the valve body, the valve spool being disposed in the fluid flow path between a supply port and a work port, and between a load sense passage and a pressure relief port, the valve spool having a valve surface exposed to fluid pressure upstream of the load sense passage and an opposite valve surface exposed to fluid pressure downstream of the load sense passage;
a pilot-operated pressure limiter valve having a pressure limiter valve member exposed to fluid pressure downstream from the load sense passage, the pilot-operated pressure limiter valve being configured to open when the downstream fluid pressure acting on the pressure limiter valve member exceeds a predetermined pressure level;
wherein the valve spool is configured to move in the flow path between a first position and a second position to control pressure and regulate fluid flow from the supply port to the work port in response to the differences in upstream and downstream fluid pressure exerted on the opposite valve surfaces of the valve spool;
wherein, when the pilot-operated pressure limiter valve is opened, the upstream fluid pressure acting on the valve spool moves the valve spool to the second position in which flow from the supply port to the work port is regulated by the valve spool to satisfy only the pilot flow through the pilot-operated pressure limiter valve so as to reduce fluid pressure to the predetermined pressure level, wherein when the valve spool is in the second position, the valve spool is configured to close the flow path from the load sense passage to the pressure relief port; and wherein, the valve spool is configured to move in the flow path between the second position and a third position, and when the upstream fluid pressure acting on the valve spool exceeds a pressure level that is greater than the predetermined pressure level of the pilot-operated pressure limiter valve, the valve spool moves to the third position in which the flow from the load sense passage to the pressure relief port is regulated for relieving fluid pressure in the valve body.

20. A control valve comprising:

a valve body having a fluid flow path that fluidly connects a supply port, a work port, a load sense passage, and a pressure relief port;

a main control valve member extending through at least a portion of the valve body, the main control valve member being movable relative to the valve body and within the fluid flow path to control the direction of fluid flow through the valve body; and a pressure-regulating pressure-relief valve member movable in the valve body and being disposed in the fluid flow path between the supply port and the work port, and between the load sense passage and the pressure relief port, the pressure-regulating pressure-relief valve member having a first valve surface exposed to fluid pressure upstream of the load sense passage and an opposite second valve surface exposed to fluid pressure downstream of the load sense passage;

wherein, in response to fluid pressure acting on the opposite first and second valve surfaces of the valve member, the valve member is configured to move to a pressure relieving position in which the flow path from the load sense passage to the pressure relief port is opened for relieving fluid pressure in the valve body.

* * * * *